(12) United States Patent
Schober et al.

(10) Patent No.: US 11,171,751 B2
(45) Date of Patent: Nov. 9, 2021

(54) INDICATING CONTIGUOUS RESOURCE ALLOCATION

(71) Applicant: Nokia Technologies Oy, Espoo (FI)

(72) Inventors: Karol Schober, Helsinki (FI); Timo E. Lunttila, Espoo (FI); Juha S. Korhonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/146,167

(22) Filed: Sep. 28, 2018

(65) Prior Publication Data
US 2019/0097771 A1   Mar. 28, 2019

Related U.S. Application Data

(60) Provisional application No. 62/564,420, filed on Sep. 28, 2017.

(51) Int. Cl.
*H04L 5/00*      (2006.01)
*H04W 72/04*   (2009.01)

(52) U.S. Cl.
CPC .......... *H04L 5/0039* (2013.01); *H04L 5/0094* (2013.01); *H04W 72/042* (2013.01); *H04W 72/0453* (2013.01); *H04W 72/0446* (2013.01)

(58) Field of Classification Search
CPC ........... H04W 72/042; H04W 72/0446; H04W 72/0453; H04W 72/04; H04W 72/1289;
(Continued)

(56) References Cited

U.S. PATENT DOCUMENTS

2017/0171838 A1* 6/2017 Wu ................. H04L 1/1614
2017/0318564 A1* 11/2017 Lee ................. H04L 5/001
(Continued)

FOREIGN PATENT DOCUMENTS

EP           3319387 B1    11/2020
WO    WO-2017000903 A1    1/2017

OTHER PUBLICATIONS

NEC: *More Details of Frequency-domain RA Schemes for NR* 3GPP TSG-RAN WG1 Meeting #90. Prague, Czech Republic, Aug. 21-25, 2017. R1-1714050.
(Continued)

*Primary Examiner* — Asad M Nawaz
*Assistant Examiner* — Najeeb Ansari
(74) *Attorney, Agent, or Firm* — Harrington & Smith

(57) ABSTRACT

According to an example of an embodiment, a method is provided including transmitting, from a base station to a user equipment, at least one message indicative of a starting resource and an ending resource of a resource allocation, wherein the at least one message comprises: a resource indication value indicating an index of the starting resource corresponding to either a first resource allocation granularity or a second resource allocation granularity different from the first resource allocation granularity, a number of contiguously allocated resources following the starting resource, and at least one of: an offset value related to the first resource allocation granularity; and a truncation indication for indicating whether the user equipment is to truncate the resource allocation; and communicating, by the base station, data in accordance with the starting resource and the ending resource.

15 Claims, 7 Drawing Sheets

(58) Field of Classification Search
CPC . H04W 72/1268; H04W 72/14; H04W 88/02; H04W 72/0413; H04W 72/0406; H04W 72/044
See application file for complete search history.

(56) References Cited

U.S. PATENT DOCUMENTS

| | | | | |
|---|---|---|---|---|
| 2018/0132211 A1* | 5/2018 | Huang | .................. | H04L 5/0094 |
| 2018/0343665 A1* | 11/2018 | Yan | ....................... | H04W 72/12 |
| 2018/0352571 A1* | 12/2018 | Wang | ................ | H04W 72/0453 |
| 2019/0082431 A1* | 3/2019 | Yl | ....................... | H04W 72/042 |
| 2019/0090126 A1* | 3/2019 | Hayashi | ............ | H04W 72/0446 |
| 2019/0116594 A1* | 4/2019 | Kwak | .................. | H04L 5/0044 |
| 2019/0229964 A1* | 7/2019 | Ouchi | .................. | H04L 5/0058 |
| 2019/0274163 A1* | 9/2019 | Han | .................... | H04W 74/006 |
| 2020/0107300 A1* | 4/2020 | Kwak | ................. | H04W 72/042 |

OTHER PUBLICATIONS

InterDigital, Inc.: *On Data Resource Allocation for NR* 3GPP TSG RAN WG1 Meeting #90. Nagoya, Japan Sep. 18-21, 2017. R1-1716482.
Guangdong OPPO Mobile Telecom: *Resource Allocation for PDSCH/PUSCH* 3GPP TSG RAN WG1 Meeting NR#3. Nagoya, Japan, Sep. 18-21, 2017. R1-1715690.
*Design aspects of sPDSCH by Erissson*, 3GPP TSG-RAN WG1 Meeting #90, R1-1712903, Prague, Czech Republic, Aug. 21-25, 2017.
*SPUSCH transmission in sTTI* by ZTE, 3GPP TSG RAN WG1 Meeting #90, R1-1712331; Prague, Czech Republic, Aug. 21-25, 2017.
Work Item (WI) for 3GPP Rel-14/15 titled "New Work Item on shortened TTI (sTTI) and processing time for LTE" (RP-171468).
"Discussion on frequency domain resource allocation", Fujitsu, 3GPP TSG RAN WG1 Meeting #90, R1-1712741, Aug. 2017, 4 pages.

* cited by examiner

800: TRANSMITTING, FROM THE BASE STATION TO A USER EQUIPMENT, AT LEAST ONE MESSAGE INDICATIVE OF A STARTING RESOURCE AND AN ENDING RESOURCE OF A RESOURCE ALLOCATION, WHEREIN THE AT LEAST ONE MESSAGE COMPRISES: A RESOURCE INDICATION VALUE (RIV) INDICATING AN INDEX OF THE STARTING RESOURCE CORRESPONDING TO EITHER A FIRST RESOURCE ALLOCATION GRANULARITY OR A SECOND RESOURCE ALLOCATION GRANULARITY DIFFERENT FROM THE FIRST RESOURCE ALLOCATION GRANULARITY, A NUMBER OF CONTIGUOUSLY ALLOCATED RESOURCES FOLLOWING THE STARTING RESOURCE, AND AT LEAST ONE OF:
- AN OFFSET VALUE RELATED TO THE FIRST RESOURCE ALLOCATION GRANULARITY; AND
- A TRUNCATION INDICATION FOR INDICATING WHETHER THE USER EQUIPMENT IS TO TRUNCATE THE RESOURCE ALLOCATION

802: COMMUNICATING, BY THE BASE STATION, DATA IN ACCORDANCE WITH THE STARTING RESOURCE AND THE ENDING RESOURCE

FIG. 8

INDICATING CONTIGUOUS RESOURCE ALLOCATION

CROSS-REFERENCE TO RELATED APPLICATION

This application claims the benefit of U.S. Provisional Application No. 62/564,420 filed on Sep. 28, 2017, which is hereby incorporated by reference in its entirety.

TECHNICAL FIELD

Various example embodiments relate generally to wireless systems and, more specifically, relate to frequency domain resource allocation in wireless systems.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

In LTE, indications of frequency-domain resource allocations are sent to a user equipment (UE) in a downlink control information (DCI) messages carried on the PDCCH. The DCI messages include resource assignments and other control information for a UE or group of UEs, To increase signaling efficiency, different types of DCI messages may be used depending on the system deployment and UE configuration. And different DCI message can contain different types of frequency-domain resource allocations. For example, 'Type 0' resource allocations, a bitmap is used to indicate Resource Block Groups (RBGs) which are allocated to the scheduled UE, where a REG is a group of consecutive physical resource blocks. Another example are 'Type 2' resource allocations, where the allocated resources are indicated based on a starting position and a contiguous set of physical resource blocks.

BRIEF SUMMARY

According to an example of an embodiment, a method is provided including determining, by a user equipment, a first resource allocation granularity and a second resource allocation granularity different from the first resource allocation granularity; receiving, at the user equipment, at least one message indicating a resource allocation for either downlink or uplink, wherein the at least one message comprises a resource indication value indicating an index of a starting resource of the resource allocation, and a number of contiguously allocated resources following the starting resource, and at least one of: an offset value related to the first resource allocation granularity; and a truncation indication for indicating whether the user equipment is to truncate the resource allocation; determining, by the user equipment, the starting resource and an ending resource of the resource allocation based at least on the at least one message; and communicating, by the user equipment, data in accordance with the determined starting resource and the ending resource.

According to another example of an embodiment, an apparatus is provided including at least one processor; and at least one non-transitory memory including computer program code, the at least one memory and the computer program code configured to, with the at least one processor, cause the apparatus to perform at least determining, by a user equipment, a first resource allocation granularity and a second resource allocation granularity different from the first resource allocation granularity; receiving, at the user equipment, at least one message indicating a resource allocation for either downlink or uplink, wherein the at least one message comprises a resource indication value indicating an index of a starting resource of the resource allocation, and a number of contiguously allocated resources following the starting resource, and at least one of: an offset value related to the first resource allocation granularity; and a truncation indication for indicating whether the user equipment is to truncate the resource allocation; determining, by the user equipment, the starting resource and an ending resource of the resource allocation based at least on the at least one message; and communicating, by the user equipment, data in accordance with the determined starting resource and the ending resource.

According to another example of an embodiment, a computer readable medium is provided, the computer readable medium including program instructions for causing an apparatus to perform at least the following: determining, by a user equipment, a first resource allocation granularity and a second resource allocation granularity different from the first resource allocation granularity; receiving, at the user equipment, at least one message indicating a resource allocation for either downlink or uplink, wherein the at least one message comprises a resource indication value indicating an index of a starting resource of the resource allocation, and a number of contiguously allocated resources following the starting resource, and at least one of: an offset value related to the first resource allocation granularity; and a truncation indication for indicating whether the user equipment is to truncate the resource allocation; determining, by the user equipment, the starting resource and an ending resource of the resource allocation based at least on the at least one message; and communicating, by the user equipment, data in accordance with the determined starting resource and the ending resource.

According to an example of an embodiment, a method is provided including transmitting, from a base station to a user equipment, at least one message indicative of a starting resource and an ending resource of a resource allocation, wherein the at least one message comprises: a resource indication value indicating an index of the starting resource corresponding to either a first resource allocation granularity or a second resource allocation granularity different from the first resource allocation granularity, a number of contiguously allocated resources following the starting resource, and at least one of: an offset value related to the first resource allocation granularity; and a truncation indication for indicating whether the user equipment is to truncate the resource allocation; and communicating, by the base station, data in accordance with the starting resource and the ending resource.

According to another example of an embodiment, an apparatus is provided including at least one processor; and at least one non-transitory memory including computer program code, the at least one memory and the computer program code configured to, with the at least one processor, cause the apparatus to perform at least transmitting, from a base station to a user equipment, at least one message indicative of a starting resource and an ending resource of a resource allocation, wherein the at least one message comprises: a resource indication value indicating an index of the starting resource corresponding to either a first resource allocation granularity or a second resource allocation granularity different from the first resource allocation granularity, a number of contiguously allocated resources following the starting resource, and at least one of: an offset value related to the first resource allocation granularity; and a truncation indication for indicating whether the user equipment is to truncate the resource allocation; and communicating, by the base station, data in accordance with the starting resource and the ending resource.

According to another example of an embodiment, a computer readable medium is provided, the computer readable medium including program instructions for causing an apparatus to perform at least the following: transmitting, from a base station to a user equipment, at least one message indicative of a starting resource and an ending resource of a resource allocation, wherein the at least one message comprises: a resource indication value indicating an index of the starting resource corresponding to either a first resource allocation granularity or a second resource allocation granularity different from the first resource allocation granularity, a number of contiguously allocated resources following the starting resource, and at least one of: an offset value related to the first resource allocation granularity; and a truncation indication for indicating whether the user equipment is to truncate the resource allocation; and communicating, by the base station, data in accordance with the starting resource and the ending resource.

BRIEF DESCRIPTION OF THE DRAWINGS

In the attached Drawing Figures:

FIGS. 7 and 8 are logic flow diagrams for indicating contiguous resource allocation, and illustrate the operation of exemplary methods, a result of execution of computer program instructions embodied on a computer readable memory, functions performed by logic implemented in hardware, and/or interconnected means for performing functions in accordance with exemplary embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Although the description below occasionally refers to LTE terms, these terms are equally applicable to other wireless networks unless indicated otherwise, including but not limited to, New Radio (5G) systems and LTE-Advanced Pro systems. For example, the term eNB is also applicable to a gNB of a 5G wireless system.

The exemplary embodiments herein describe techniques for indicating contiguous resource allocation. Additional description of these techniques is presented after a system into which the exemplary embodiments may be used is described.

Figure 1:
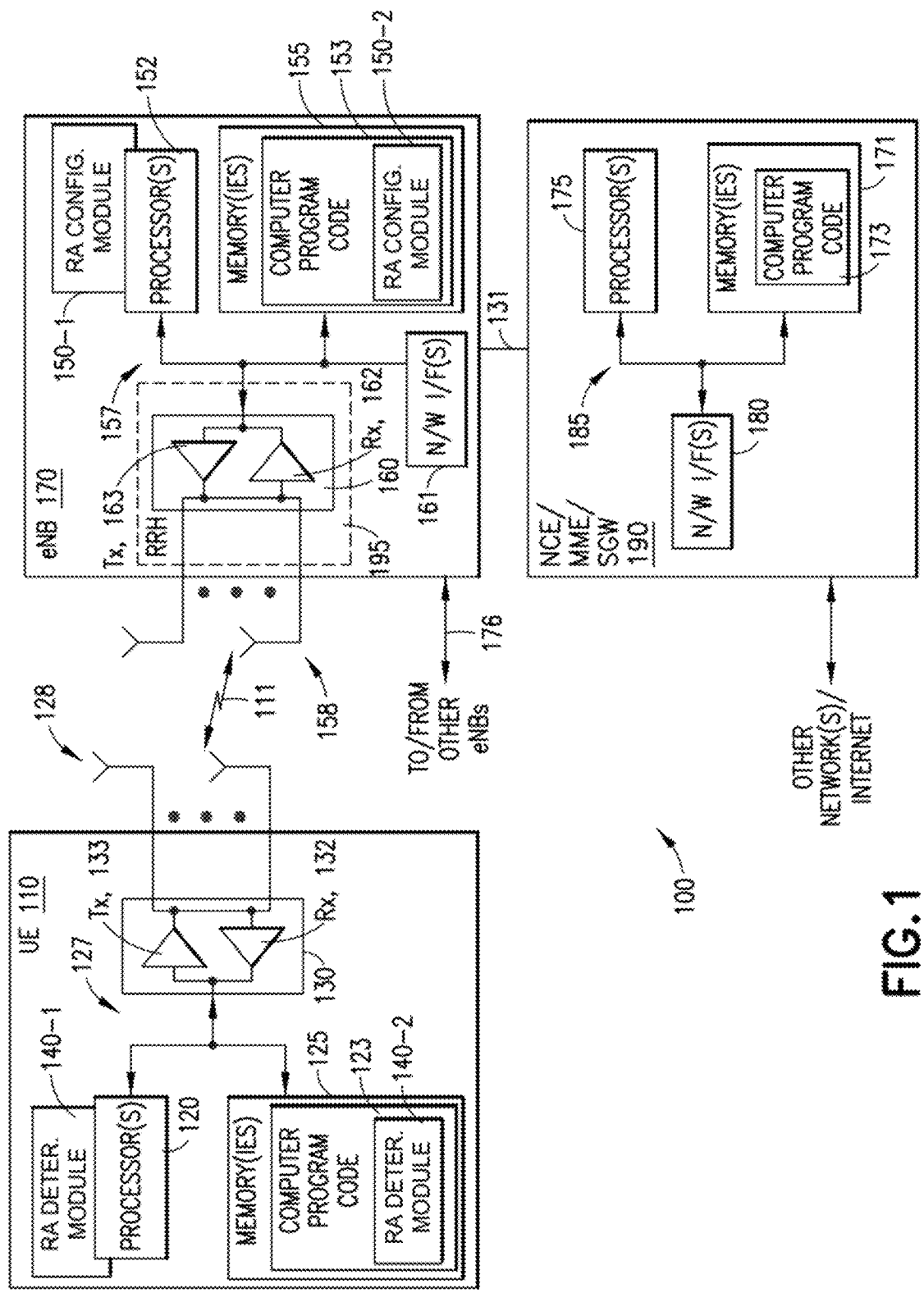
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a RA Determination (RA deter.) module, comprising one of or both parts 140-1 and/or 140-2, which may be implemented in a number of ways. The RA deter. module may be implemented in hardware as RA deter. module 140-1, such as being implemented as part of the one or more processors 120. The RA deter. module 140-1 may be implemented also as an integrated circuit or through other hardware such as a programmable gate array. In another example, the RA deter. module may be implemented as RA deter. module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a RA configuration (RA config.) module, comprising one of or both parts 150-1 and/or 150-2, which may be implemented in a number of ways. The RA config. module may be implemented in hardware as RA config. module 150-1, such as being implemented as part of the one or more processors 152. The RA config. module 150-1 may be implemented also as an integrated circuit or through other hardware such as a programmable gate array. In another example, the RA config. module 150 may be implemented as RA config. module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

The wireless network 100 may include one or more network control elements (NCE) 190 that may include MME (Mobility Management Entity) and/or SGW (Serving Gateway) functionality, and which provides connectivity with a further network, such as a telephone network and/or a data communications network (e.g., the Internet). It is noted that terms NCE, MME, and SGW are terms generally used for the core elements in a LTE network. Those skilled in the art will appreciate that 5G wireless systems may implement core network elements differently than an LTE wireless network. These NFs may include, for example, Access and Mobility Function (AMF), Session Management Function (SMF), Policy Control Function (PCF), Application Function (AF), Authentication Server Function (AUSF), User Plane Function (UPF), and User Data Management (UDM). Each NF may be implemented in similar way as shown for NCE 190, namely, as a network element on a dedicated hardware or as a software instance running on a dedicated hardware. Additionally, these NFs may be a virtualized function instantiated on an appropriate platform, such as a cloud infrastructure for example. It is also noted that a 5G radio could act as a slave to an LTE radio and connect to the same LTE core network.

The eNB 170 is coupled via a link 131 to the NCE 190. The link 131 may be implemented as, e.g., an S1 interface. For 5G wireless systems, the link 131 may represent a 5G interface, such as NG2 or NG3 for example. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

3GPP Rel-15 will include 3GPP New Radio (5G) system, as well as LTE-Advanced Pro system. The following agreements related to Resource Allocation (RA) signaling were reached in New Radio ad-hoc meeting (NRAH#2):

PUSCH with DFT-s-OFDM waveform, contiguous resource allocation based on LTE UL RA Type 0

PUSCH with CP-OFDM waveform, contiguous resource allocation based on LTE UL RA Type 0

DCI format with RA based on LTE DL RA type 0 (i.e., bit-map) is supported for PUSCH with CP-OFDM waveform.

DCI format with RA based on LTE UL RA type 0 is supported for PUSCH with CP-OFDM and with DFT-s-OFDM PDSCH: RA based on LTE DL RA Type 2

DCI format with resource allocation based on LTE DL RA type 0 (i.e., bit-map) is supported for PDSCH.

DCI format with resource allocation based on LTE DL RA type 2 is supported for PDSCH.

FFS: some or all of the above DCI formats have the same DCI payload size.

As can be seen from the above, both DL and UL, LTE DL-Type-2 and UL-Type-0 based resource allocations are to be supported, however, the details are still undecided.

A Work Item (WI) for 3GPP Rel-14/15 titled "New Work Item on shortened TTI (sTTI) and processing time for LTE" (RP-171468) has been approved. The objectives of the work item are:

For Frame structure type 1: [RAN1, RAN2, RAN4]
Specify support for a transmission duration based on 2-symbol sTTI and 1-slot sTTI for sPDSCH/sPDCCH
Specify support for a transmission duration based on 2-symbol sTTI, 4-symbol sTTI, and 1-slot sTTI for sPUCCH/sPUSCH
Down-selection is not precluded
Study any impact on CSI feedback and processing time, and if needed, specify necessary modifications (not before RAN1 #86bis)
For Frame structure type 2: [RAN1, RAN2, RAN4]
Specify support for a transmission duration based on 1-slot sTTI for sPDSCH/sPDCCH/sPUSCH/sPUCCH
Study any impact on CSI feedback and processing time, and if needed, specify necessary modifications (not before RAN1 #86bis).

3GPPP has yet to decide how signaling allocation of Resource Blocks (RBs) or bandwidth parts in NR or in LTE with sTTIs is to be performed.

Start-length resource allocation (such as used in Type 2 DL and Type 0 UL LTE RA, for example) is based on an indication of:

Start: The index of the starting resource block or a resource block group
Length: The number contiguously allocated resource blocks (or resource block groups) following the starting resource block Two main goals when designing start-stop resource allocation for sTTI in LTE are:

1. sTTI design is backward compatible with legacy TTI; and
2. RA overhead for sTTI in the DCI should be lower than that of sTTI.

The second goal can be achieved by increasing the RA granularity. As seen in Table 1 below, for start-length RA (Type 2) and 10 MHz system BW, with each "multiple" of RB granularity the number of bits required decreases by one bit.

TABLE 1

| Multiple M | Legacy | 2x | 3x | 4x |
|---|---|---|---|---|
| Type 0 [RBG] | 17 | 9 | 6 | 5 |
| Type 2 [RB] | 11 | 9 | 8 | 7 |

Figure 2:
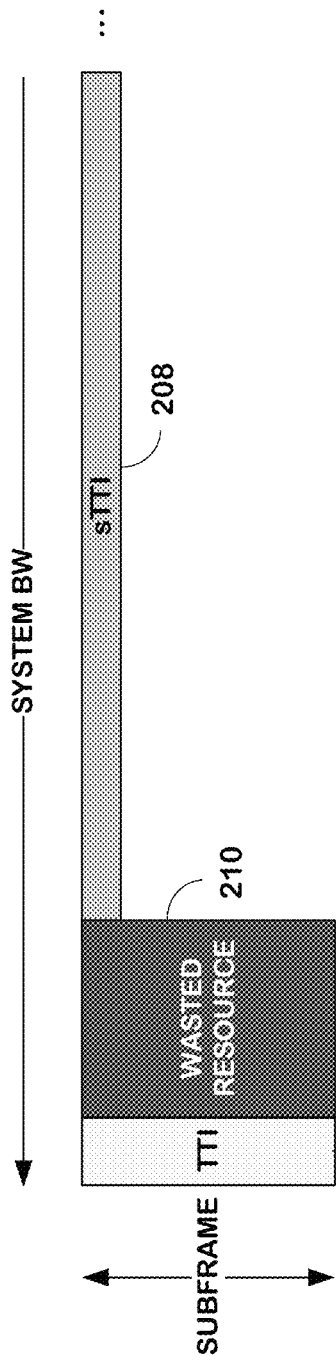
FIG. 2 is an example resource allocation associated with legacy resource allocations.

However, when RB granularity for sTTI (sRBG) increases too much (e.g. by 12x to 12 RB), multiplexing with legacy TTI becomes inefficient, as demonstrated in FIG. 2 for example.

Referring to FIG. 2, a portion of system bandwidth is shown corresponding to a subframe. Assume a legacy UE is allocated for a small amount of data (for example, VoIP, FB message) on 3 RBs (RBG) as shown by transmission time interval (TTI) 206. Also assume the granularity of RA for sTTI 208 (for example, the starting RB raster) is 12 RB (sRBG). This situation results in wasted resources 210, because the remaining resource from the sRBG where legacy TTI is allocated cannot be allocated for sTTI. In the previous example, where RB granularity for sTTI increases too much (e.g. by 12x to 12 RB), then a 9 RBs (i.e. 12 RB-3 RB)×14 symbols block is wasted.

In NR design, a similar problem exists, which stems from introducing a new feature called flexible BW. The LTE system BW is replaced in NR by a user-specific BWP (BandWidth Part) operating on a network (NW) carrier. A NR gNB can operate different users on different BWPs of a single NW carrier. BWPs can be of different BW, they can also fully or partially overlap.

Figure 3:
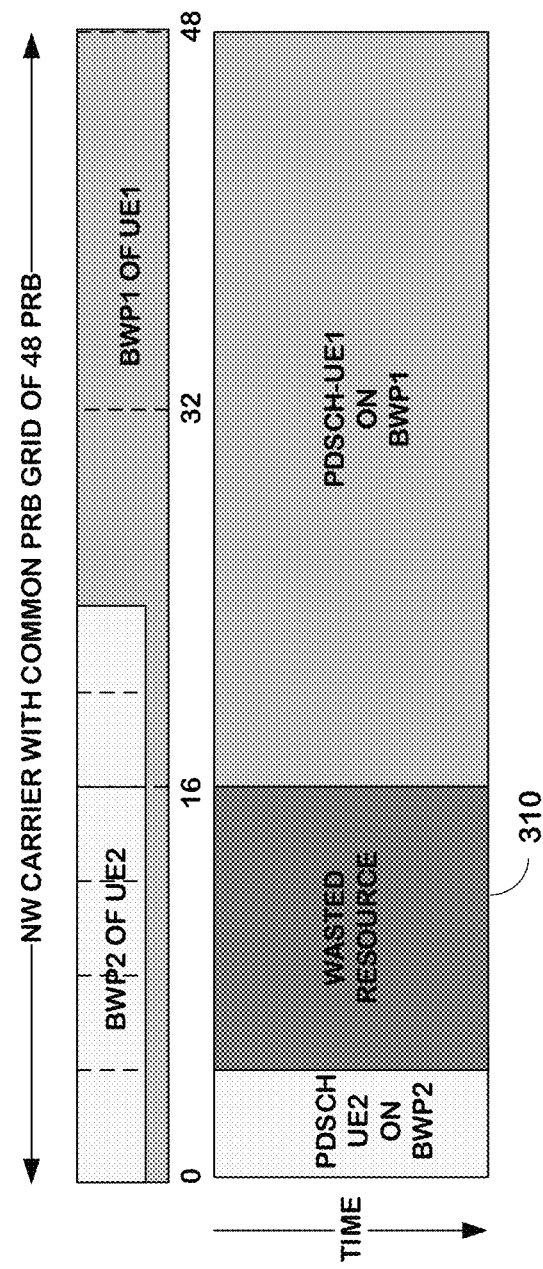
FIG. 3 is an example resource allocation when flexible BW is used to allocate two user equipments.

Referring now to FIG. 3, this figure illustrates an example of wasted resources when flexible BW is used to allocate two user equipments. In the example shown in FIG. 3, a UE1 is configured with BWP1 comprising 48 PRBs (e.g. 40 MHz with 60 kHz SCS) and with a configured RBG size of 16 RBs. At the same time a UE2 is configured with BWP2 comprising 24 RBs (20 MHz with 60 kHz SCS) and an RBG size of 4 RBs. Such configuration for UE2 is necessary if the UE2 is capable of only operating at most on a 20 MHz BW and, therefore, cannot operate on the full BW of 48 PRBs. Similarly, as in sTTI LTE case, a gNB configuring a BWP1 with 16 RB RBG and BWP2 with 4 RB RBG, results in wasted resources 310, because these resource cannot be allocated to UE1 configured with 16 RB RBG. Typically, a wide BWP would operate with coarser RBG compared to a narrow BWP.

Some attempts to address these wasted resources are described in the following documents: [1] Design aspects of sPDSCH by Erissson, 3 GPP TSG-RAN WG1 Meeting #90, R1-1712903, Prague, Czech Republic, 21st-25th Aug. 2017; and [2] sPUSCH transmission in sTTI by ZTE, 3GPP TSG RAN WG1 Meeting #90, R1-1712331; Prague, Czech Republic, $21^{st}$-$25^{th}$ Aug. 2017.

Generally, these documents describe increasing granularity of length, but not (or alternatively) the granularity of the start. However, each one of these documents suffers from one or more of the following disadvantages: require complicated RIV determination, and do not fully address problems such as those detailed above with reference to FIGS. 2, 3, and 4.

Figure 4:
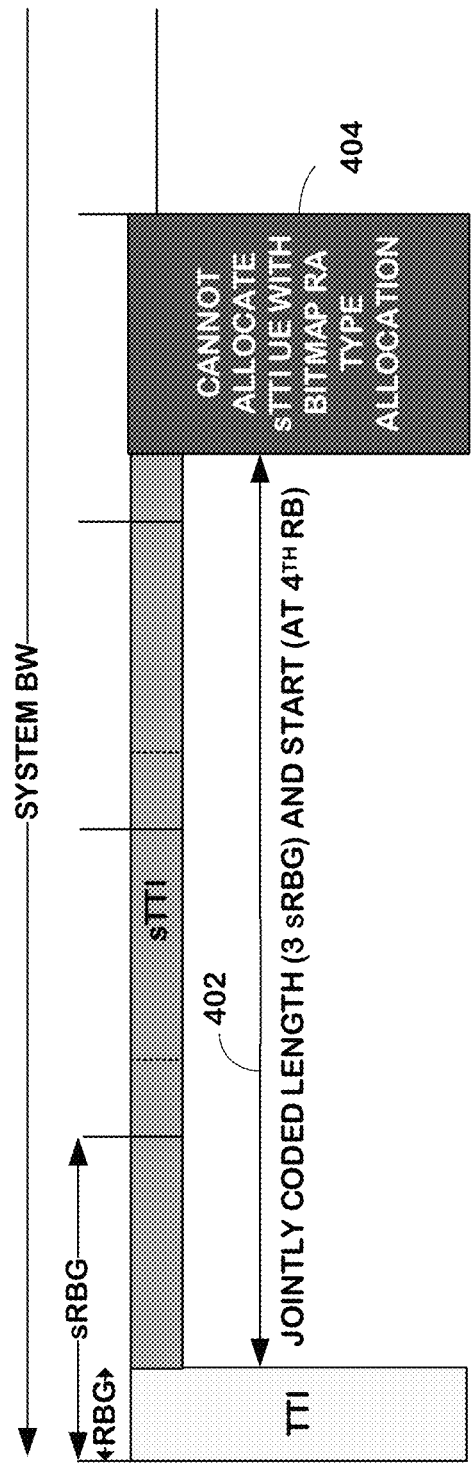
FIG. 4 is an example resource allocation in accordance with related techniques.

FIG. 4 shows an example related to the techniques in documents R1-1712903 and R1-1712331. In particular, according to FIG. 4, sRBGs are 12 RBs wide and an eNB allocates 3 sRBGs starting from the $4^{th}$ RB as indicated by arrow 402 i.e. the granularity for start is smaller than the granularity of the length. In this example, the remainder of the sRBG in third sRBG cannot be used by another sTTI UE with bitmap RA (e.g. DL Type 0) allocation, which operates on a per sRBG level. Thus, there is a possibility that the resources in block 404 are still wasted.

Embodiments described herein address these issues, which in LTE occur when operating sTTI and TTI with different RBG sizes, and in NR occurs when operating two overlapping BWPs with different RBG sizes. Example embodiments relate to enhancing the Resource Allocation (RA) based on signaling the start and length of the allocation (start-length RA), such as Type 2 DL and Type 0 UL RA.

Generally, according to example embodiments, a user equipment may determine a first resource allocation granularity, such as a RBG size or RBG size of NB BWP. The first resource allocation granularity may be fixed in the specification or configurable. The UE determines a second resource allocation granularity, such as a sRBG size or a RBG size of WB BWP for example. The second resource allocation granularity may also be fixed in the specification or configurable. The UE then receives a downlink control information (DCI) message indicating a resource allocation for either downlink or uplink, which includes a Resource indication value (RIV) for determining:

a Start of the resource allocation, with the first or the second allocation granularity; and
  a Length corresponding to a number of contiguously allocated resource blocks with the second resource allocation granularity.

In addition to the RIV, the DCI message also includes at least one of the following:

An offset, with a third resource allocation granularity. The third granularity may be the same as the first granularity, or e.g. correspond to a single RB; and
  1-bit indication of whether or not to truncate the resource block allocation to the first or the second resource allocation granularity.

This information can be also higher layer signaled or truncation can be fixed in specification.

Based on the received values, the user equipment may then determine the starting RB, and the ending RB as described in more detail below. The user equipment then receives DL data on sPDSCH/NR-PDSCH, and/or transmitting UL data on sPUSCH/NR-PUSCH, according to the determined Starting RB and ending RB of the resource allocation.

Two options are detailed below for enhancing resource allocation. Both of these options facilitate different resource allocation granularities for indication of the starting resource block, and the last allocated resource blocks, while ensuring that the last allocated resource block can be made to match the resource block allocation raster for sTTI operation with bitmap resource allocation type. In other words, these options allow for the starting resource block raster to match with that of regular (non-short TTI) LTE, while the raster for ending resource blocks is coarser than that.

Option 1

Option 1 utilizes a similar resource allocation scheme such as described in FIG. 4, where the starting RB can be allocated with finer granularity than the length. However, the resources are additionally truncated to the sRBG grid by specification or, alternatively, a 1-bit indicator in DCI indicating whether the RA is truncated to sRBG grid or not. According to some examples embodiments, higher-layer signaling (for example, RRC signaling) could configure whether the truncation is applied or not by a user equipment.

More specifically, according to an example embodiment a starting resource block is indicated to a user equipment with the first granularity of e.g. one RB, or one RBG (e.g. 3 RBs). The number of contiguously allocated resource blocks (or alternatively the ending resource block) are allocated with the second granularity of e.g. sRBG (which may comprise e.g. 12 RBs). The allocated resources may be expressed as follows:

Starting RB=Start*first_granularity
  Ending RB=Start*first_granularity+Length*second_granularity−mod((Start*first_granularity), second_granularity))

In some examples, the "mod" term may or may not be applied depending on the value of a 1-bit indicator or higher-layer signaling.

Figure 5:
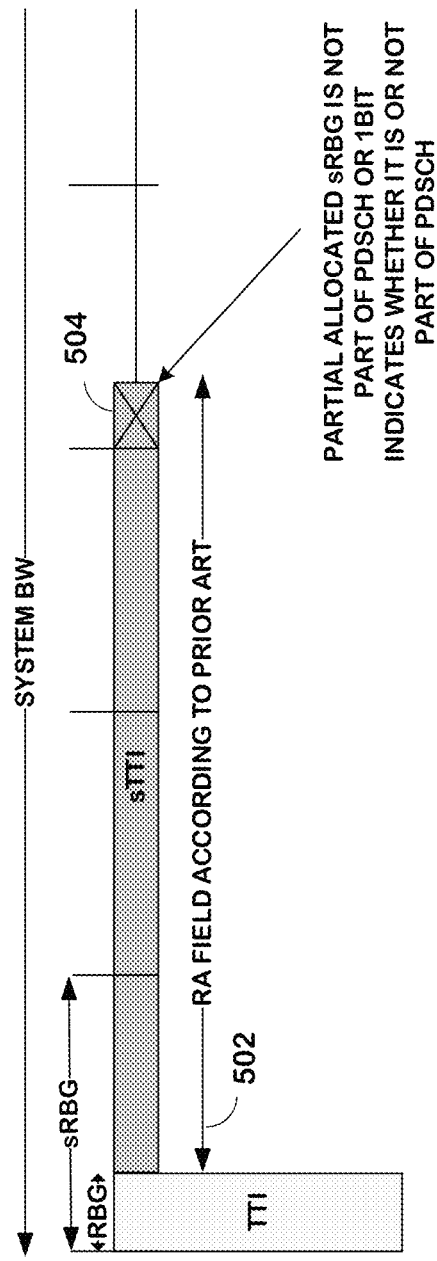
FIG. 5 is an example resource allocation in accordance with an example embodiment.

Referring now to FIG. 5, this figure provides an example resource allocation for option 1 in accordance with an example embodiment. In FIG. 5, the resource allocation field may be similar to FIG. 4, namely, 3 sRBGs may be allocated starting from the 4$^{th}$ RB as indicated by arrow 502.

According to option 1, the UE may determine whether the partially allocated sRBG sTTI is to be excluded from the allocated sPDSCH resources. In some embodiments, the exclusion may always occur, while in other embodiments the exclusion may be based on a 1-bit indication in DCI or higher-layer configuration.

Option 2

Option 2 utilizes a similar resource allocation as in the legacy case (e.g. FIG. 2). The granularity is the same for start and length and the starting RB or RBG within the starting sRBG is indicated with an additional offset.

According to an example embodiment, both the starting resource and the number of contiguously allocated resource blocks (or alternatively the ending resource block) are allocated with the granularity of sRBG (e.g. 12 RBs). That is, the start and length are both indicated in the second granularity and offset is indicated in the first granularity. The allocated resources according to option 2 can be expressed as:

Starting RB=Start*second_granularity+offset (in first_granularity)
  Ending RB (when 1-bit indicator or higher-layer signaling or specification indicates no truncation) =Start*second_granularity+offset (in first_granularity)+Length*second_granularity, or
  Ending RB (when 1-bit indicator or higher-layer signaling or specification indicates truncation) =Start*second_granularity+ Length*second_granularity The ending RB may depend on the value of a 1-bit indicator or higher-layer signaling or whether truncation is specified.

Figure 6:
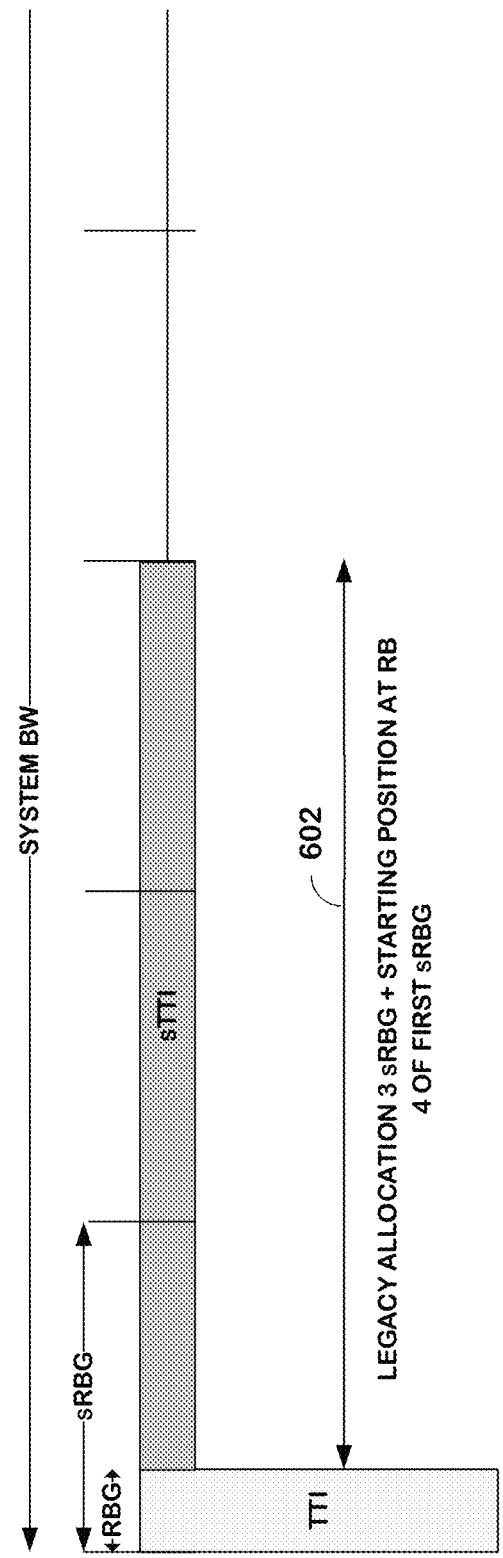
FIG. 6 is an example resource allocation in accordance with another example embodiment.

Referring now to FIG. 6, this figure illustrates an example resource allocation for option 1 in accordance with an example embodiment. In the example shown in FIG. 6, a UE is allocated with 3 sRBGs. An additional offset field also indicates the starting position within the starting allocated sRBG. As a consequence, 4 bits in 10 MHz system BW are required to indicate start-length sRBGs (12 RB) and 2 bits to indicate the starting RBG (3 RB) within the starting sRBG (12 RB). The total amount of bits is 6 bits. Additionally, the end position within the ending sRBG can also be made flexible at the expense of additional bits.

Figure 7:
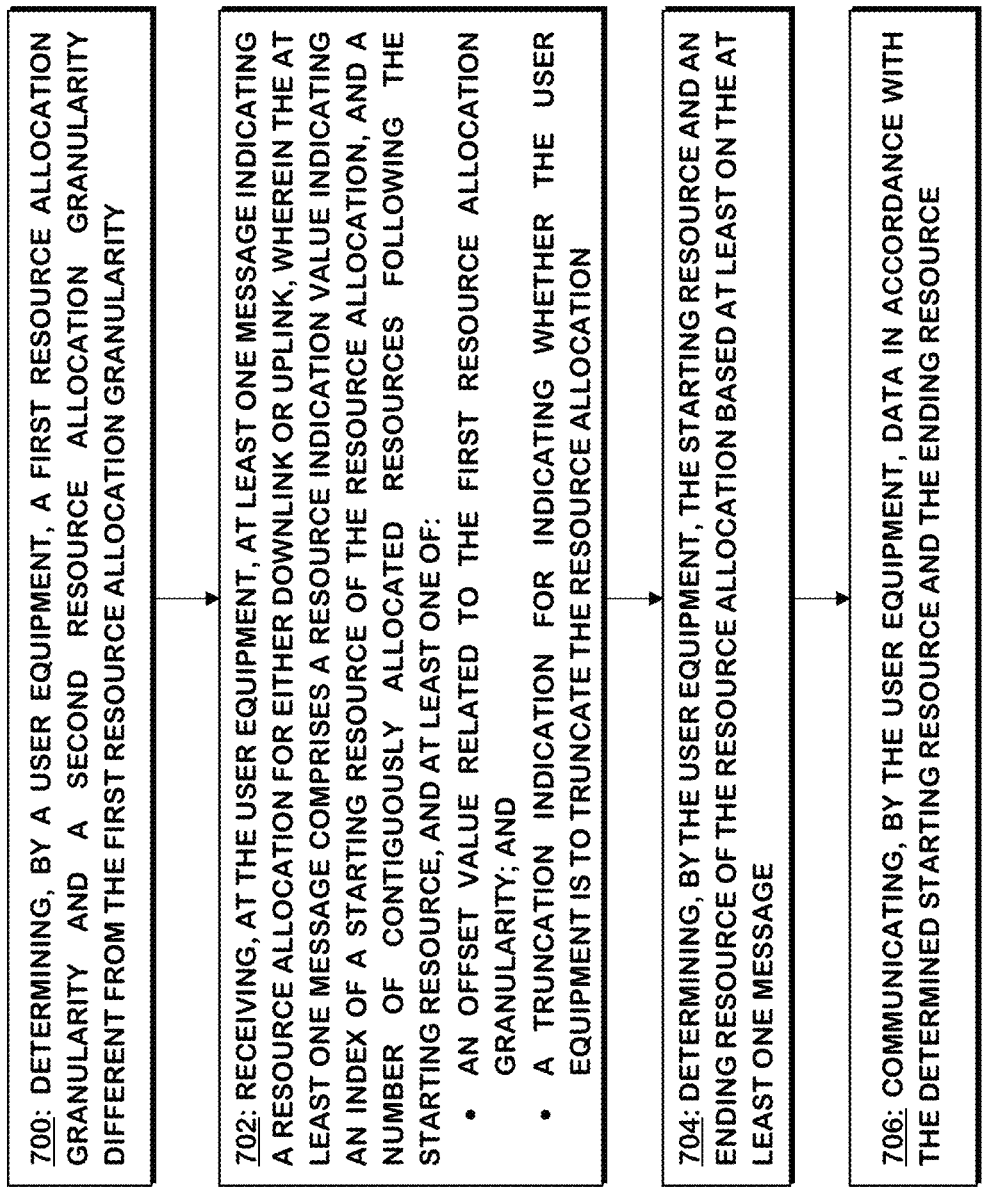

FIG. 7 is a logic flow diagram for indicating contiguous resource allocation. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the RA deter. module 140-1 and/or 140-2 may include multiples ones of the blocks in FIG. 7, where each included block is an interconnected means for performing the function in the block. The blocks in FIG. 7 are assumed to be performed by the UE 110, e.g., under control of the RA deter. module 140-1 and/or 140-2 at least in part.

According to one example embodiment, a method is provided including: determining, by a user equipment, a first resource allocation granularity and a second resource allocation granularity different from the first resource allocation granularity as indicated by block 700; receiving, at the user equipment, at least one message indicating a resource allocation for either downlink or uplink, wherein the at least one message comprises a resource indication value (RIV) indicating an index of a starting resource of the resource allocation, and a number of contiguously allocated resources following the starting resource, and at least one of: an offset value related to the first resource allocation granularity; and a truncation indication for indicating whether the user equipment is to truncate the resource allocation as indicated by block 702; determining, by the user equipment, the starting resource and an ending resource of the resource allocation based at least on the at least one message as indicated by block 704; and communicating, by the user equipment, data in accordance with the determined starting resource and the ending resource as indicated by block 706.

Each of the contiguously allocated resources may have a size in accordance with the second resource allocation granularity.

Determining the starting resource may include: determining a size of the starting resource based on the first resource allocation granularity, and determining the starting resource based on the index and the determined size of the starting resource.

Determining the ending resource may be based on the determined starting resource; and the number and the size of the contiguously allocated resources.

Determining the ending resource may be further based on a value of the truncation indication such that the ending resource is truncated to align in accordance with both the first resource allocation granularity and the second resource allocation granularity.

The at least one message may include the offset value and determining the starting resource of the resource allocation may include: determining a size of the starting resource based on the second resource allocation granularity, wherein the starting resource is based on the index of the starting resource, the size of the starting resource, and the offset value.

In response to determining that the truncation indication indicates the user equipment is to truncate the resource allocation, determining the ending resource may be based on: the determined size and the index of the starting resource, and the number and the size of the contiguously allocated resources.

In response to determining that the truncation indication indicates the user equipment is not to truncate the resource allocation, determining the ending resource may be based on: the determined size and the index of the starting resource, the offset value, and the number and the size of the contiguously allocated resources.

The first resource allocation granularity may correspond to a first resource block group size; and the second resource allocation granularity may correspond to a second resource block group size that is larger than the first resource group size.

The at least one message may comprises at least one of a downlink control information message and a radio resource control message.

The truncation indication may be is one-bit and may be received in either the downlink control information message or the radio resource control message.

Communicating the data may include at least one of: receiving downlink data on a sPDSCH, and transmitting uplink data on a sPUSCH.

Each of the starting resource, the ending resource, and the contiguously allocated resources may be either a resource block group or a resource block.

In another example of an embodiment, an apparatus comprises means for determining, by a user equipment, a first resource allocation granularity and a second resource allocation granularity different from the first resource allocation granularity; means for receiving, at the user equipment, at least one message indicating a resource allocation for either downlink or uplink, wherein the at least one message comprises a resource indication value (RIV) indicating an index of a starting resource of the resource allocation, and a number of contiguously allocated resources following the starting resource, and at least one of: an offset value related to the first resource allocation granularity; and a truncation indication for indicating whether the user equipment is to truncate the resource allocation; means for determining, by the user equipment, the starting resource and an ending resource of the resource allocation based at least on the at least one message; and means for communicating, by the user equipment, data in accordance with the determined starting resource and the ending resource.

The apparatus may further include means for performing a method in accordance with any one of paragraphs [0062]-[0073].

In another example of an embodiment, an apparatus may include at least one processor; and at least one non-transitory memory including computer program code, the at least one memory and the computer program code configured to, with the at least one processor, cause the apparatus at least to: determine, by a user equipment, a first resource allocation granularity and a second resource allocation granularity different from the first resource allocation granularity; receive, at the user equipment, at least one message indicating a resource allocation for either downlink or uplink, wherein the at least one message comprises a resource indication value (RIV) indicating an index of a starting resource of the resource allocation, and a number of contiguously allocated resources following the starting resource, and at least one of: an offset value related to the first resource allocation granularity; and a truncation indication for indicating whether the user equipment is to truncate the resource allocation; determine, by the user equipment, the starting resource and an ending resource of the resource allocation based at least on the at least one message; and communicate, by the user equipment, data in accordance with the determined starting resource and the ending resource.

The at least one memory and the computer program code may be configured to, with the at least one processor, to cause the apparatus further to perform a method in accordance with any one of paragraphs [0062]-[0073].

FIG. 8 is a logic flow diagram for indicating contiguous resource allocation. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the RA config. module 150-1 and/or 150-2 may include multiples ones of the blocks in FIG. 8, where each included block is an interconnected means for performing the function in the block. The blocks in FIG. 8 are assumed to be performed by a base station such as eNB 170, e.g., under control of the RA config. module 150-1 and/or 150-2 at least in part.

According to an example embodiment, a method is provided including: transmitting, from the base station to a user equipment, at least one message indicative of a starting resource and an ending resource of a resource allocation, wherein the at least one message comprises: a resource indication value (RIV) indicating an index of the starting resource corresponding to either a first resource allocation granularity or a second resource allocation granularity different from the first resource allocation granularity, a number of contiguously allocated resources following the starting resource, and at least one of: an offset value related to the first resource allocation granularity; and a truncation indication for indicating whether the user equipment is to truncate the resource allocation as indicated by block 800; and communicating, by the base station, data in accordance with the starting resource and the ending resource as indicated by block 802.

Each of the contiguously allocated resources may have a size in accordance with the second resource allocation granularity.

The starting resource may be based on: a size of the starting resource corresponding to the first resource allocation granularity, the index of the starting resource.

The ending resource may be based on the starting resource, and the number and the size of the contiguously allocated resources.

The ending resource may be based on a value of the truncation indication such that the ending resource is truncated to align in accordance with both the first resource allocation granularity and the second resource allocation granularity.

The at least one message may include the offset value and the starting resource may be based on: a size of the starting resource corresponding to the second resource allocation granularity, the index of the starting resource, and the offset value.

The truncation indication may indicate that the resource allocation is to be truncated, and the ending resource may be based on: the size and the index of the starting resource, and the number and the size of the contiguously allocated resources.

The truncation indication may indicate that the resource allocation is not to be truncated, and the ending resource may be based on: the size and the index of the starting resource, the offset value, and the number and the size of the contiguously allocated resources.

The first resource allocation granularity may correspond to a first resource block group size; and the second resource allocation granularity may correspond to a second resource block group size that is larger than the first resource group size.

The at least one message may be at least one of a downlink control information message and a radio resource control message.

The truncation indication may be and is transmitted in either the downlink control information message or the radio resource control message.

Communicating the data may include at least one of: transmitting downlink data on a sPDSCH, and receiving uplink data on a sPUSCH.

The starting resource, the ending resource, and the contiguously allocated resources may include resource block groups or resource blocks.

In another example of an embodiment, an apparatus may include means for transmitting, from a base station to a user equipment, at least one message indicative of a starting resource and an ending resource of a resource allocation, wherein the at least one message comprises: a resource indication value (RIV) indicating an index of the starting resource corresponding to either a first resource allocation granularity or a second resource allocation granularity different from the first resource allocation granularity, a number of contiguously allocated resources following the starting resource, and at least one of: an offset value related to the first resource allocation granularity; and a truncation indication for indicating whether the user equipment is to truncate the resource allocation; and means for communicating, by the base station, data in accordance with the starting resource and the ending resource.

The apparatus may further include means for performing a method in accordance with any one of paragraphs [0080]-[0091].

In another example of an embodiment, an apparatus may include at least one processor; and at least one non-transitory memory including computer program code, the at least one memory and the computer program code configured to, with the at least one processor, cause the apparatus at least to: transmit, from a base station to a user equipment, at least one message indicative of a starting resource and an ending resource of a resource allocation, wherein the at least one message comprises: a resource indication value (RIV) indicating an index of the starting resource corresponding to either a first resource allocation granularity or a second resource allocation granularity different from the first resource allocation granularity, a number of contiguously allocated resources following the starting resource, and at least one of: an offset value related to the first resource allocation granularity; and a truncation indication for indicating whether the user equipment is to truncate the resource allocation; and communicate, by the base station, data in accordance with the starting resource and the ending resource.

The at least one memory and the computer program code may be configured to, with the at least one processor, to cause the apparatus further to perform a method accordance with any one of paragraphs [0080]-[0091].

A communication system may include an apparatus in accordance with any one of the paragraphs [0092]-[0095] and an apparatus in accordance with any one of the paragraphs [0074]-[0077].

An additional example of an embodiment includes a computer program, comprising code for performing a method in accordance with any one of paragraphs [0079]-[0091] or paragraphs [0061]-[0073] when the computer program is run on a processor. The computer program according to this paragraph, wherein the computer program is a computer program product comprising a computer-readable medium bearing computer program code embodied therein for use with a computer.

Without in any way limiting the scope, interpretation, or application of the claims appearing below, a technical effect of one or more of the example embodiments disclosed herein is providing the possibility to schedule back-to-back (in frequency) one UE with start-stop RA and another UE with bitmap RA. Another technical effect of one or more of the example embodiments disclosed herein is reusing the existing simple RA formula (mapping from RA to RIV). Another technical effect of one or more of the example embodiments disclosed herein is improving network resources by saving signaling bits.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP 3$^{rd}$ Generation Partnership Project
ACK acknowledgment
ARI acknowledgment resource indicator
BWP bandwidth part
DCI downlink control information
eNB (or eNodeB) evolved Node B (e.g., an LTE base station)
I/F interface
HARQ hybrid automatic request
LTE long term evolution
MME mobility management entity
NB narrow-band
NCE network control element
NR New Radio (i.e. 5G)
N/W network
PRB physical resource block
RA Resource Allocation
RB resource block
RBG resource block group
RIV resource indication value
RRH remote radio head
Rx receiver
SGW serving gateway
sPSCCH short physical downlink control channel
sPUCCH short physical uplink control channel
sPDSCH short physical downlink shared channel
SPUSCH short physical uplink shared channel
SR scheduling request
sRBG sTTI Resource Block Group
sTTI short TTI
Tx transmitter
UE user equipment (e.g., a wireless, typically mobile device)
WB wide-band

What is claimed is:

1. A method comprising:
determining, by a user equipment, a first resource allocation granularity and a second resource allocation granularity different from the first resource allocation granularity;
receiving, at the user equipment, at least one message indicating a resource allocation for downlink, wherein the at least one message comprises information comprising a resource indication value indicating an index of a starting resource of the resource allocation, and a number of contiguously allocated resources following the starting resource, and an offset value related to the first resource allocation granularity;
determining, by the user equipment, the starting resource and an ending resource of the resource allocation based at least on the information in the at least one message and on the second resource allocation granularity; and
communicating, by the user equipment, data in accordance with the determined starting resource and the ending resource.

2. The method as in claim 1, wherein each of the contiguously allocated resources have a size in accordance with the second resource allocation granularity.

3. The method as in claim 1, wherein determining the starting resource comprises:
determining a size of the starting resource based on the first resource allocation granularity, and
determining the starting resource based on the index and the determined size of the starting resource.

4. The method as in claim 1, wherein the determining of the ending resource is based on the determined starting resource; and the number and the size of the contiguously allocated resources.

5. The method as in claim 1, wherein the determining of the starting resource of the resource allocation comprises:
determining a size of the starting resource based on the second resource allocation granularity, wherein the starting resource is based on the index of the starting resource, the size of the starting resource, and the offset value.

6. The method as in claim 1, wherein:
the first resource allocation granularity corresponds to a first resource block group size; and
the second resource allocation granularity corresponds to a second resource block group size that is larger than the first resource group size.

7. The method as in claim 1, wherein the at least one message comprises at least one of a downlink control information message and a radio resource control message.

8. The method as in claim 1, wherein communicating the data comprises:
receiving downlink data on a short physical downlink shared channel.

9. The method as in claim 1, wherein:
the starting resource, the ending resource, and the contiguously allocated resources comprise either resource block groups or resource blocks.

10. An apparatus comprising:
at least one processor; and
at least one non-transitory memory including computer program code, the at least one memory and the computer program code configured to, with the at least one processor, cause the apparatus to perform at least:
determining, by a user equipment, a first resource allocation granularity and a second resource allocation granularity different from the first resource allocation granularity;
receiving, at the user equipment, at least one message indicating a resource allocation for downlink, wherein the at least one message comprises information comprising a resource indication value indicating an index of a starting resource of the resource allocation, and a number of contiguously allocated resources following the starting resource, and an offset value related to the first resource allocation granularity;

determining, by the user equipment, the starting resource and an ending resource of the resource allocation based at least on the information in the at least one message and on the second resource allocation granularity; and communicating, by the user equipment, data in accordance with the determined starting resource and the ending resource.

11. The apparatus as in claim 10, wherein each of the contiguously allocated resources have a size in accordance with the second resource allocation granularity.

12. The apparatus as in claim 10, wherein the determining of the starting resource comprises:

determining a size of the starting resource based on the first resource allocation granularity, and determining the starting resource based on the index and the determined size of the starting resource.

13. The apparatus as in claim 10, wherein the determining of the ending resource is based on the determined starting resource; and the number and the size of the contiguously allocated resources.

14. The apparatus as in claim 10, wherein the determining of the starting resource of the resource allocation comprises:

determining a size of the starting resource based on the second resource allocation granularity, wherein the starting resource is based on the index of the starting resource, the size of the starting resource, and the offset value.

15. A non-transitory computer readable medium comprising program instructions for causing an apparatus to perform at least the following:

determining, by a user equipment, a first resource allocation granularity and a second resource allocation granularity different from the first resource allocation granularity;

receiving, at the user equipment, at least one message indicating a resource allocation for downlink, wherein the at least one message comprises information comprising a resource indication value indicating an index of a starting resource of the resource allocation, and a number of contiguously allocated resources following the starting resource, and an offset value related to the first resource allocation granularity;

determining, by the user equipment, the starting resource and an ending resource of the resource allocation based at least on the information in the at least one message and on the second resource allocation granularity; and communicating, by the user equipment, data in accordance with the determined starting resource and the ending resource.

* * * * *